Dec. 3, 1935. E. A. TOOHEY 2,022,750
METHOD OF MANUFACTURING MOISTURE RESISTANT MINERAL WOOL
Filed Dec. 24, 1929

INVENTOR.
Edward A. Toohey.
BY D. N. Halstead
ATTORNEY

Patented Dec. 3, 1935

2,022,750

UNITED STATES PATENT OFFICE 2,022,750

METHOD OF MANUFACTURING MOISTURE-RESISTANT MINERAL WOOL

Edward A. Toohey, Somerville, N. J., assignor to Johns-Manville Corporation, New York, N. Y., a corporation of New York Application December 24, 1929, Serial No. 416,282

4 Claims. (Cl. 49—77.5)

The present invention relates to an improved form of mineral wool adapted for use as a heat-insulating material and other structural purposes.

The primary object of the invention is the provision of a moisture resistant material from mineral wool and an efficient and economical method of producing such a product.

Mineral wool is commonly produced from certain forms of silicate rock or slag, the mineral material being first melted and then a thin stream of the molten material is blown into fibers by means of a jet of steam or air. The fibers thus produced are collected in a settling chamber, and thereafter utilized in various heat-insulating structures such as refrigerator walls, building partitions, and the like. The fibers are commonly used in a loosely assembled form such as a mat or blanket. The fibers are likewise widely used in a comminuted or modulated form particularly for insulating the walls of houses. While the fibers of mineral wool remain dry they fill the insulating space and exert a maximum insulating effect, however upon becoming wetted they tend to compact and produce air spaces thru which convective air currents circulate with consequent impairment of the heat insulating effectiveness of the material. The retention of water by the mineral wool is further objectionable for sanitary reasons in cases where the wool is used for insulating the walls of dwelling houses. Water may gain access to the wool either due to leaks thru the protective covering, or by condensation of moisture present in the air which circulates thru the fibers.

These disadvantages of ordinary mineral wool are obviated according to my invention by providing the surfaces of the individual fibers with a thin deposite of a water-repellent material such as zinc stearate or similar material which forms a firmly adherent and permanent coating. A further feature of my invention is the application of the zinc stearate or equivalent material to the mineral wool during the blowing operation so as to produce a particularly effective and economical distribution of the zinc stearate.

Figure 1:
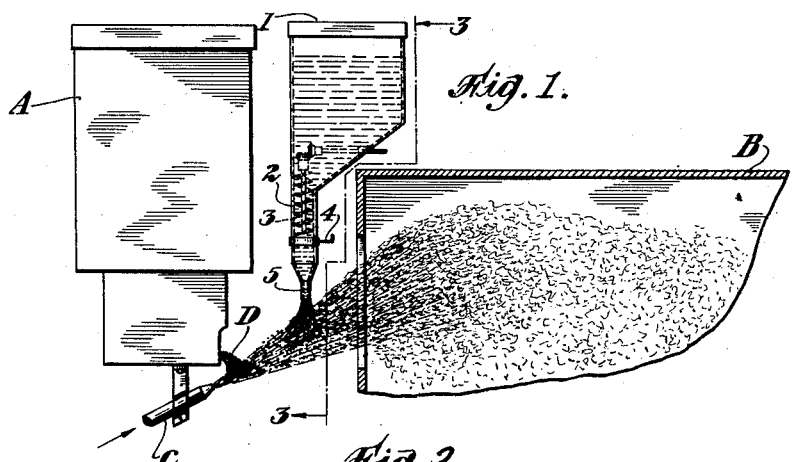
Figure 2:
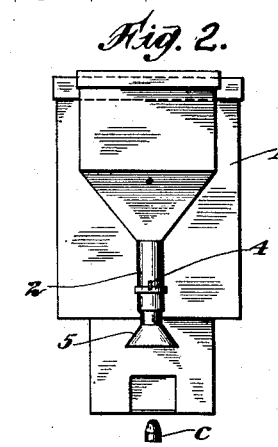

Further features and advantages of my invention will be apparent from the following detailed description thereof taken in connection with the accompanying drawing which illustrates diagrammatically suitable forms of apparatus for the practice of the invention and wherein:

Figs. 1 and 2 are side and end views, respectively, of a suitable form of apparatus for the practice of the invention.

In each of the views A represents a conventional form of cupola for melting silicates suitable for the production of rock wool, B a conventional form of settling chamber for the blown fibers, and C a conduit for the passage of steam or other fluid for disintegrating the molten rock D. The fibers which settle in the chamber B in the form of a mat or blanket or loosely assembled fibers may be conveniently removed by a conveyor.

The apparatus includes a hopper or container 1 for the zinc stearate or similar material. The hopper 1 converges into a conduit 2 having a helical screw 3 positioned therein for expelling the water-repellent material thru the nozzle 5. The quantity of material fed thru the nozzle is regulated by a suitable closure or shutter 4. The nozzle 5 is positioned so that the water-repellent material will be fed into the stream of blown fibers while the stream is still fairly concentrated thereby insuring thorough distribution over the individual fibers and also at a point where the residual heat present in the blown fibers is sufficient to melt the zinc stearate and extend it over the surfaces of the fibers. The nozzle 5 however must not be positioned at a point where the fibers are at a temperature sufficiently high to decompose the water-repellent material.

I have found metallic stearates particularly zinc stearate especially efficacious for use in any of the above described methods. However, these methods are quite effective for applying various other normally solid water-repellent materials such as aluminum stearate, aluminum palmitate, or other metallic soaps, and other fatty acid compounds having water-repellent characteristics such as stearic acid and palmitic acid. I have found the types and classes of materials mentioned particularly effective for rendering mineral wool moisture-resistant as a relatively small quantity of the material may be applied so as to form a permanent and effective water-resistant coating. Heretofore liquid material such as oil has been admixed with mineral wool principally for the purpose of settling fine dust-like particles and such treatments with oil resulted in some incidental water-proofing effect. The oil coatings so formed, however, were not permanent inasmuch as the coatings although immiscible with water, were readily washed away and hence are not comparable with the solid permanent water repellent coatings formed on the mineral wool fibers according to my invention which are capable of withstanding even the action of hot water.

A finely divided solid material such as talc may also be used in association with the water-repellent material and serves as an extender or carrier. The amount of extender added may be widely varied but under most conditions it is advantageous to use it in major proportions, for example, a mixture of 75% talc and 25% zinc stearate. The extender is thoroughly incorporated with the water-repellent material before application by mixing in a suitable form of mixer or agitator.

What I claim is:—

1. The method of preparing heat-insulating material from mineral wool produced by blowing molten mineral substances into fibers which comprises admixing with the blown fibers while still suspended and heated normally solid inherently water-repellent material in a finely divided or powdered form.

2. The method of preparing heat-insulating material from mineral wool produced by blowing molten mineral substances into fibers, which comprises admixing a powdered inherently water-repellent material with the blown fibers at a stage wherein said fibers are at a temperature sufficiently high to melt said material and extend it over the surfaces of the fibers, but below the temperature which would cause undue decomposition of said material.

3. The method of preparing heat-insulating material from mineral wool produced by blowing molten mineral substances into fibers, which comprises admixing a finely divided or powdered normally solid inherently water-repellent material with the blown fibers, and utilizing the residual heat in the blown fibers to extend said material over the surfaces of the fibers.

4. The method of preparing heat-insulating material from mineral wool produced by blowing molten mineral substances into fibers which comprises admixing with the blown fibers while still suspended and heated a mixture of a normally solid inherently water-repellent material and an extender such as talc in a finely divided or powdered form.

EDWARD A. TOOHEY.